(12) United States Patent
Roy et al.

(10) Patent No.: US 9,314,048 B2
(45) Date of Patent: Apr. 19, 2016

(54) BEVERAGE PRODUCTS WITH NON-NUTRITIVE SWEETENER AND BITTERANT

(75) Inventors: Glenn Roy, Beacon, NY (US); Thomas Lee, Scarsdale, NY (US)

(73) Assignee: THE CONCENTRATE MANUFACTURING COMPANY OF IRELAND, Hamilton (BM)

( * ) Notice: Subject to any disclaimer, the term of this patent is extended or adjusted under 35 U.S.C. 154(b) by 1067 days.

(21) Appl. No.: 12/960,873

(22) Filed: Dec. 6, 2010

(65) Prior Publication Data

US 2011/0097447 A1    Apr. 28, 2011

Related U.S. Application Data

(63) Continuation-in-part of application No. 12/635,446, filed on Dec. 10, 2009, which is a continuation of application No. 11/686,260, filed on Mar. 14, 2007, now abandoned.

(51) Int. Cl.
| | | |
|---|---|---|
| A23L 1/236 | (2006.01) | |
| A23L 2/385 | (2006.01) | |
| A23L 2/56 | (2006.01) | |
| A23L 2/60 | (2006.01) | |

(52) U.S. Cl.
CPC ............. *A23L 2/385* (2013.01); *A23L 1/2366* (2013.01); *A23L 2/56* (2013.01); *A23L 2/60* (2013.01); *A23V 2002/00* (2013.01)

(58) Field of Classification Search
None
See application file for complete search history.

(56) References Cited

U.S. PATENT DOCUMENTS

| | | | |
|---|---|---|---|
| 1,280,150 A | 10/1918 | Brodsky | |
| 2,539,160 A | 1/1951 | Phillips | |
| 3,531,296 A | 9/1970 | Smithies | |
| 3,856,942 A | 12/1974 | Murphy | |
| 3,934,047 A | 1/1976 | Schade | |
| 4,082,858 A | 4/1978 | Morita et al. | |
| 4,176,201 A | 11/1979 | Cook | |
| 4,219,579 A | 8/1980 | Piampiano | |
| 4,277,511 A | 7/1981 | Bliznak et al. | |
| 4,361,697 A | 11/1982 | Dobberstein et al. | |
| 4,454,165 A | 6/1984 | Sato et al. | |
| 4,479,972 A | 10/1984 | Soukup et al. | |
| 4,612,942 A | 9/1986 | Dobberstein et al. | |
| 4,738,856 A | 4/1988 | Clark | |
| 4,772,482 A | 9/1988 | Olinger et al. | |
| 4,830,862 A | 5/1989 | Braun et al. | |
| 4,830,870 A | 5/1989 | Davis, Jr. et al. | |
| 4,870,059 A | 9/1989 | Mitsuhashi et al. | |
| 4,902,525 A | 2/1990 | Kondou | |
| 4,925,686 A | 5/1990 | Kastin | |
| 4,956,191 A | 9/1990 | Ueda et al. | |
| 4,959,225 A | 9/1990 | Wong et al. | |
| 4,990,354 A | 2/1991 | Bakal et al. | |
| 4,992,279 A | 2/1991 | Palmer et al. | |
| 4,996,196 A | 2/1991 | Mitsuhashi et al. | |
| 5,013,716 A | 5/1991 | Cherukuri et al. | |
| 5,059,428 A | 10/1991 | Wong et al. | |
| 5,059,429 A | 10/1991 | Cherukuri et al. | |
| 5,106,644 A | 4/1992 | El-Nokaly | |
| 5,219,842 A | 6/1993 | Okada et al. | |
| 5,232,735 A | 8/1993 | Kurtz et al. | |
| 5,411,755 A | 5/1995 | Downton et al. | |
| 5,411,775 A | 5/1995 | Wilson | |
| 5,417,994 A | 5/1995 | Chang et al. | |
| 5,433,965 A | 7/1995 | Fischer et al. | |
| 5,437,880 A | 8/1995 | Takaichi et al. | |
| 5,464,619 A | 11/1995 | Kuznicki et al. | |
| 5,480,667 A | 1/1996 | Corrigan et al. | |
| 5,631,038 A | 5/1997 | Kurtz et al. | |
| 5,637,618 A | 6/1997 | Kurtz et al. | |
| 5,643,956 A | 7/1997 | Kurtz et al. | |
| 5,646,122 A | 7/1997 | Kurtz et al. | |
| 5,650,403 A | 7/1997 | Kurtz et al. | |
| 5,654,311 A | 8/1997 | Kurtz et al. | |
| 5,665,755 A | 9/1997 | Kurtz et al. | |
| 5,681,569 A | 10/1997 | Kuznicki et al. | |
| 5,700,792 A | 12/1997 | Kurtz et al. | |

(Continued)

FOREIGN PATENT DOCUMENTS

| | | |
|---|---|---|
| CN | 101557726 | 10/2009 |
| CN | 101662952 | 3/2010 |

(Continued)

OTHER PUBLICATIONS

First Examination Report dated Oct. 15, 2010, issued from corresponding Indian Patent Application No. 2773/MUMNP/2008.
International Search Report and Written Opinion from corresponding PCT/US2010/059074, dated Feb. 4, 2011.
Busch-Stockfisch Mechthild et al.: "Sensory Evaluation of the Bitter Taste of Amarogentin and its Possible Exchange for Quinine in Soft Drinks: 2. Influence of Saccharin Sodium/Fructose Mixture and Anhydrous Citric Acid", 1993 Zeitschrift Fuer Lebensmittel-Untersuchung Und—Forschung, vol. 196, NR. 3, pp. 255-258, XP002618080.
Busch-Stockfisch M. et al.: "Sensorische Beurteilung Des Bittergeschmacks Von Amarogentin Und Austauschmoeglichkeiten Gegen Chinin in Erfrischungsgetraenken//Sens Ory—Evaluation of the Bitter Taste of Amarogentin and the Feasibility of its Exchange for Quinine in Soft Drinks", Zeitschrift Fuer Lebensmitteluntersuchung Und—Forschung, XX, XX, vol. 192, No. 1, Jan. 1, 1991, pp. 11014, XP009068685.

(Continued)

*Primary Examiner* — Elizabeth Gwartney
(74) *Attorney, Agent, or Firm* — Sterne, Kessler, Goldstein & fox, P.L.L.C.

(57) ABSTRACT

Aspects of the invention relate to beverage compositions, including, for example, concentrated and ready-to-drink formulations sweetened with at least one non-nutritive sweetener and further comprising a bitterant in an amount sufficient to reduce the lingering sweet aftertaste of the non-nutritive sweetener(s). In certain illustrative embodiments, the bitterant comprises gentian. Another aspect of the invention relates to a method that combines a non-nutritive sweetener having a lingering sweet aftertaste with a bitterant to create a mixture such that when the mixture is contained in a beverage, the bitterant is present in an amount sufficient to reduce the lingering sweet aftertaste of the non-nutritive sweetener.

19 Claims, No Drawings

(56) References Cited

U.S. PATENT DOCUMENTS

| | | |
|---|---|---|
| 5,703,053 A | 12/1997 | Kurtz et al. |
| 5,780,086 A | 7/1998 | Kirksey et al. |
| 5,827,560 A | 10/1998 | Fu et al. |
| 5,830,523 A | 11/1998 | Takaichi et al. |
| 5,866,608 A | 2/1999 | Kurtz et al. |
| 5,895,672 A | 4/1999 | Cooper |
| 5,916,881 A | 6/1999 | Okada et al. |
| 6,007,856 A | 12/1999 | Cox et al. |
| 6,008,250 A | 12/1999 | Kurtz et al. |
| 6,010,734 A | 1/2000 | Whelan et al. |
| 6,015,792 A | 1/2000 | Kurtz et al. |
| 6,054,168 A | 4/2000 | Lioutas et al. |
| 6,083,549 A | 7/2000 | Harada et al. |
| 6,132,787 A | 10/2000 | Bunger et al. |
| 6,136,356 A | 10/2000 | Bunger et al. |
| 6,180,155 B1 | 1/2001 | Lotz et al. |
| 6,210,738 B1 | 4/2001 | Chen |
| 6,255,557 B1 | 7/2001 | Brandle |
| 6,265,012 B1 | 7/2001 | Shamil |
| 6,361,812 B1 | 3/2002 | Ekanayake et al. |
| 6,375,992 B1 | 4/2002 | Blumenstein-Stahl et al. |
| 6,376,005 B2 | 4/2002 | Bunger et al. |
| 6,391,864 B1 | 5/2002 | Stone |
| 6,413,561 B1 | 7/2002 | Sass et al. |
| 6,416,806 B1 | 7/2002 | Zhou |
| 6,432,464 B1 | 8/2002 | Andersen et al. |
| 6,432,470 B2 | 8/2002 | Chaen et al. |
| 6,432,929 B1 | 8/2002 | Stone |
| 6,544,577 B1 | 4/2003 | Chu et al. |
| 6,558,723 B2 | 5/2003 | Ekanayake et al. |
| 6,589,555 B2 | 7/2003 | Pandya |
| 6,599,553 B2 | 7/2003 | Kealey et al. |
| 6,616,955 B2 | 9/2003 | Nunes et al. |
| 6,632,449 B2 | 10/2003 | Niehoff |
| 6,652,901 B2 | 11/2003 | Ishii |
| 6,682,766 B2 | 1/2004 | Blumenstein-Stahl et al. |
| 6,703,056 B2 | 3/2004 | Mehansho et al. |
| 6,706,295 B2 | 3/2004 | Mehansho et al. |
| 6,749,879 B2 | 6/2004 | Broz |
| 6,749,881 B2 | 6/2004 | Kataoka et al. |
| 6,759,067 B1 | 7/2004 | Ogasawara et al. |
| 6,759,073 B2 | 7/2004 | Heisey et al. |
| 6,780,443 B1 | 8/2004 | Nakatsu et al. |
| 6,783,789 B2 | 8/2004 | Mutilangi et al. |
| 6,794,375 B2 | 9/2004 | Sarama et al. |
| 6,821,545 B2 | 11/2004 | Bernhardt et al. |
| 6,838,106 B2 | 1/2005 | Kumamoto et al. |
| 6,838,107 B1 | 1/2005 | Bakal et al. |
| 6,838,109 B2 | 1/2005 | Nunes et al. |
| 6,890,567 B2 | 5/2005 | Nakatsu et al. |
| 6,899,901 B2 | 5/2005 | Nakatsu et al. |
| 6,984,376 B2 | 1/2006 | Stephenson et al. |
| 6,986,906 B2 | 1/2006 | Selzer et al. |
| 7,029,717 B1 | 4/2006 | Ojima et al. |
| 7,033,629 B2 | 4/2006 | Koss et al. |
| 7,052,725 B2 | 5/2006 | Chang et al. |
| 7,056,548 B2 | 6/2006 | Ogura et al. |
| 7,090,883 B2 | 8/2006 | Phipps |
| 7,105,190 B2 | 9/2006 | Ekanayake et al. |
| 7,781,005 B2 | 8/2010 | Mori |
| 7,964,232 B2 * | 6/2011 | Lee .................. 426/548 |
| 2001/0008641 A1 | 7/2001 | Krotzer |
| 2002/0004092 A1 | 1/2002 | Riha, III et al. |
| 2002/0122847 A1 | 9/2002 | Nunes et al. |
| 2002/0132037 A1 | 9/2002 | Zhou |
| 2002/0160090 A1 | 10/2002 | Lee et al. |
| 2002/0197371 A1 | 12/2002 | Lee et al. |
| 2003/0003212 A1 | 1/2003 | Chien et al. |
| 2003/0026872 A1 | 2/2003 | Dake et al. |
| 2003/0035875 A1 | 2/2003 | Dulebohn et al. |
| 2003/0059511 A1 | 3/2003 | Ishii |
| 2003/0096047 A1 | 5/2003 | Riha, III et al. |
| 2003/0170365 A1 | 9/2003 | Huang |
| 2003/0190396 A1 | 10/2003 | Merkel et al. |
| 2003/0211214 A1 | 11/2003 | Riha, III et al. |
| 2003/0224095 A2 | 12/2003 | DuBois et al. |
| 2003/0236399 A1 | 12/2003 | Zheng et al. |
| 2004/0022914 A1 | 2/2004 | Allen |
| 2004/0076728 A2 | 4/2004 | Merkel et al. |
| 2004/0115329 A1 | 6/2004 | Tamiya et al. |
| 2004/0142084 A1 | 7/2004 | Kneuven |
| 2004/0151771 A1 | 8/2004 | Gin et al. |
| 2004/0170735 A2 | 9/2004 | Merkel et al. |
| 2004/0197453 A1 | 10/2004 | Hirao et al. |
| 2004/0247669 A1 | 12/2004 | Gin et al. |
| 2005/0058763 A1 | 3/2005 | Cetrulo et al. |
| 2005/0069616 A1 | 3/2005 | Lee et al. |
| 2005/0106305 A1 | 5/2005 | Abraham et al. |
| 2005/0136169 A1 | 6/2005 | Haung et al. |
| 2005/0152997 A1 | 7/2005 | Selzer et al. |
| 2005/0158444 A1 | 7/2005 | Koski |
| 2005/0208192 A1 | 9/2005 | Nakakura et al. |
| 2005/0220964 A1 | 10/2005 | Rizo et al. |
| 2005/0226983 A1 | 10/2005 | Bakal et al. |
| 2005/0260328 A1 | 11/2005 | Lutz et al. |
| 2006/0019019 A1 | 1/2006 | Rohaly et al. |
| 2006/0034873 A1 | 2/2006 | Radke et al. |
| 2006/0034897 A1 | 2/2006 | Boghani et al. |
| 2006/0068072 A9 | 3/2006 | Lee et al. |
| 2006/0068073 A1 | 3/2006 | Catani et al. |
| 2006/0073254 A1 | 4/2006 | Catani et al. |
| 2006/0083838 A1 | 4/2006 | Jackson et al. |
| 2006/0093720 A1 | 5/2006 | Tatz |
| 2006/0099309 A1 | 5/2006 | Mattson et al. |
| 2006/0099318 A1 | 5/2006 | Iwasaki et al. |
| 2006/0110519 A1 | 5/2006 | Lauber et al. |
| 2006/0127450 A1 | 6/2006 | Chinen |
| 2006/0134291 A1 | 6/2006 | Rathjen |
| 2006/0134292 A1 | 6/2006 | Abelyan et al. |
| 2006/0134294 A1 | 6/2006 | McKee et al. |
| 2006/0142555 A1 | 6/2006 | Jonnala et al. |
| 2006/0159818 A1 | 7/2006 | Kunieda |
| 2006/0159820 A1 | 7/2006 | Rathjen et al. |
| 2006/0177559 A1 | 8/2006 | Gosselin et al. |
| 2006/0204550 A1 | 9/2006 | Hassen |
| 2007/0212460 A1 | 9/2007 | Inoue et al. |
| 2008/0014331 A1 | 1/2008 | Badalov |
| 2008/0075806 A1 | 3/2008 | Dorr et al. |
| 2008/0226770 A1 | 9/2008 | Lee et al. |
| 2008/0226773 A1 | 9/2008 | Lee et al. |
| 2008/0226776 A1 | 9/2008 | Roy et al. |
| 2008/0226787 A1 | 9/2008 | Johnson et al. |
| 2008/0226788 A1 | 9/2008 | Chang et al. |
| 2008/0226789 A1 | 9/2008 | Roy et al. |
| 2008/0226790 A1 | 9/2008 | Johnson et al. |
| 2008/0226793 A1 | 9/2008 | Chang et al. |
| 2008/0226794 A1 | 9/2008 | Bell et al. |
| 2008/0226795 A1 | 9/2008 | May et al. |
| 2008/0226796 A1 | 9/2008 | Lee et al. |
| 2008/0226797 A1 | 9/2008 | Lee et al. |
| 2008/0226798 A1 | 9/2008 | Talebi et al. |
| 2008/0226799 A1 | 9/2008 | Lee et al. |
| 2008/0226800 A1 | 9/2008 | Lee et al. |
| 2008/0226801 A1 | 9/2008 | May et al. |
| 2008/0226802 A1 | 9/2008 | Lee et al. |
| 2008/0226803 A1 | 9/2008 | Letourneau et al. |
| 2008/0226804 A1 | 9/2008 | Talebi et al. |
| 2009/0004360 A1 | 1/2009 | Bingley et al. |
| 2009/0074935 A1 | 3/2009 | Lee et al. |
| 2009/0162484 A1 | 6/2009 | Bell et al. |
| 2009/0162487 A1 | 6/2009 | Bell et al. |
| 2009/0162488 A1 | 6/2009 | Bell et al. |
| 2010/0112138 A1 | 5/2010 | Roy et al. |
| 2011/0033597 A1 | 2/2011 | Bell et al. |

FOREIGN PATENT DOCUMENTS

| | | |
|---|---|---|
| FR | 878946 A | 2/1943 |
| GB | 1477292 A | 6/1977 |
| GB | 1523932 A | 9/1978 |
| GB | 2180534 A | 4/1987 |
| JP | 52-090667 | 7/1977 |
| JP | 08-256725 | 10/1996 |
| JP | 09-238641 | 9/1997 |

(56) References Cited

FOREIGN PATENT DOCUMENTS

| JP | 09-316469 | | 12/1997 |
|---|---|---|---|
| JP | 2003-113074 | | 4/2003 |
| WO | 91/18523 | A1 | 12/1991 |
| WO | 99/21548 | A1 | 5/1999 |
| WO | 02/087358 | A1 | 11/2002 |
| WO | 2005112668 | A1 | 12/2005 |
| WO | 2006072921 | A2 | 7/2006 |
| WO | 2006095366 | A1 | 9/2006 |
| WO | 2006127935 | A1 | 11/2006 |
| WO | 2007/081442 | A2 | 7/2007 |
| WO | 2008/112983 | A1 | 9/2008 |
| WO | 2008112979 | A1 | 9/2008 |

OTHER PUBLICATIONS

Reporting letter providing a summary of Mexican Office Action dated Dec. 2, 2010, issued in corresponding Mexican Patent Application No. MX/a/2009/009716. This document is provided by the Applicant's foreign associate and paragraphs providing legal counsel regarding the Office Action have been redacted.
Mexican Office Action dated Dec. 2, 2010, issued from corresponding Mexican Patent Application No. MX/a/2009/009716.
Canadian Office Action dated Dec. 29, 2010, issued from corresponding Canadian Patent Application No. 2,656,102.
Reporting letter providing a summary of Mexican Office Action dated Feb. 22, 2011, issued in corresponding Mexican Patent Application No. MX/a/2009/009716. This document is provided by the Applicant's foreign associate and the paragraph providing legal counsel regarding the Office Action have been redacted.
Mexican Office Action dated Feb. 22, 2011, issued from corresponding Mexican Patent Application No. MX/a/2009/009716.
English translation of Japanese Decision of Rejection dated May 22, 2012, issued in corresponding Japanese Patent Application No. 2009-553807. This document was provided by the Applicant's foreign associate.
Japanese Decision of Rejection dated May 22, 2012, issued in corresponding Japanese Patent Application No. 2009-553807.
English translation of the First Office Action dated May 3, 2012, issued in corresponding Chinese Patent Application No. 200880008206.1. This document was provided by the Applicant's foreign associate.
First Office Action dated May 3, 2012, issued in corresponding Chinese Patent Application No. 200880008206.1.
English translation of Japanese Office Action dated Jul. 11, 2011, issued in corresponding Japanese Patent Application No. 2009-553807. This document was provided by the Applicant's foreign associate.
Japanese Office Action dated Jul. 11, 2011, issued from corresponding Japanese Patent Application No. 2009-553807.
Canadian Office Action dated Sep. 12, 2012, issued for corresponding Canadian Patent Application No. 2,656,102.
Extended European Search Report dated Jun. 22, 2012, issued for corresponding European Patent Application No. 12000905.5.
European Office Communication dated Dec. 10, 2012, issued for corresponding European Patent Application No. 08 743 897.4.
Chinese Patent Application 201080071101.8, Office Action, with English Translation, mailed Mar. 17, 2014.
European Commission Scientific Committee of Food, Jun. 17, 1999, Opinion on Stevie Rebaudiana Bertoni plants and leaves: http://www.food.gov.uk/multimedia/pdfs/stevioside.pdf.
World Health Organization, International Programme on Chemical Safety, Safety Evaluation of Certain Food Additives, WHO Food Additive Series: 42, Prepared by the Fifty-first meeting of the Joint FAO/WHO Expert Committee on Food Additives (JECFA), Geneva, 1999, STEVIOSIDE, First draft prepared by Dr. Josef Schlatter, Swiss Federal Officer of Public Health, Switzerland: http://www.inchem.org/documents/jecfa/jecmono/v042je07.htm.
International Search Report (ISR) issued Jun. 24, 2008 in corresponding International Application No. PCT/US2008/057019.
International Preliminary Report on Patentability (IPRP) issued Sep. 24, 2009 in corresponding International Application No. PCT/US2008/057019.
First Russian Office Action issued in related Russian Patent Application No. 2008-151084.
English translation of First Russian Office Action issued in related Russian Patent Application No. 2008-151084 and dated Dec. 30, 2009. This document is provided by the Applicant's foreign associate and paragraphs not directed toward the translated Office Action have been redacted.
EPO Official Action issued in related European Patent Application No. 08 743 897.4-2114.
Second Russian Office Action issued in related Russian Patent Application No. 2008-151084.
English translation of Second Russian Office Action issued in related Russian Patent Application No. 2008-151084 and dated Apr. 20, 2010. This document is provided by the Applicant's foreign associate and paragraphs not directed toward the translated Office Action have been redacted.
Substantive Examination issued in corresponding Argentine Patent Application No. P08 01 01067, dated Aug. 25, 2010.
English translation of Substantive Examination dated Aug. 25, 2010, issued in corresponding Argentine Patent Application No. P08 01 01067. This document was provided by Applicant's foreign associate and paragraphs not directed toward the translated Substantive Examination have been redacted.
Russian Patent Application 2013131009, Office Action mailed Jul. 31, 2014.
Brazilian Office Action (Informal Translation).

\* cited by examiner

BEVERAGE PRODUCTS WITH NON-NUTRITIVE SWEETENER AND BITTERANT

CROSS-REFERENCE TO RELATED APPLICATIONS

Each of the following patent applications is hereby incorporated by reference in its entirety for all purposes: U.S. patent application Ser. No. 12/635,446, filed Dec. 10, 2009, and entitled "Beverage Products with Non-Nutritive Sweetener and Bitterant", and U.S. patent application Ser. No. 11/686,260, filed Mar. 14, 2007, and entitled "Beverage Products with Non-Nutritive Sweetener and Bitterant".

FIELD OF THE INVENTION

This invention relates to beverages and other beverage products, such as beverage concentrates and the like. In particular, this invention relates to beverages and other beverage products having formulations incorporating non-nutritive sweeteners and having improved flavor profiles and/or nutritional characteristics.

BACKGROUND

It has long been known to produce beverages of various formulations. Improved and new formulations are desirable to meet changing market demands. In particular, there is perceived market demand for beverages having alternative nutritional characteristics, including, for example, alternative calorie content. Also, there is perceived market demand for beverages having alternative flavor profiles, including good taste, mouthfeel, etc. In addition, there is consumer interest in beverages and other beverage products, such as beverage concentrates, etc. whose formulations make greater use of natural ingredients, that is, ingredients distilled, extracted, concentrated or similarly obtained from harvested plants and other naturally occurring sources, with limited or no further processing.

The development of new beverage formulations, for example, new beverage formulations employing alternative sweeteners, flavorants, flavor enhancing agents and the like, presents challenges in addressing associated bitterness, lingering sweet aftertaste, and/or other off-tastes. In addition, such challenges typically are presented in new beverage formulations developed for alternative nutritional and/or flavor profiles. Also, there is need for new beverage formulations which can satisfactorily meet the combination of objectives including nutritional characteristics, flavor, shelf life, and other objectives.

Development of new beverage formulations has faced obstacles. For example, U.S. Pat. No. 4,956,191, incorporated herein by reference in its entirety, suggests that carbonated beverages which contain blends of saccharin or a *Stevia* extract with aspartame tend to be less organoleptically pleasing than those containing sugar.

It is therefore an object of the present invention to provide beverages and other beverage products. It is an object of at least certain embodiments of the invention (that is, not necessarily all embodiments of the invention) to provide beverages and other beverage products having desirable taste properties and flavor profiles. It is an object of at least certain (but not necessarily all) embodiments of the invention to provide beverages and other beverage products having improved formulations. These and other objects, features and advantages of the invention or of certain embodiments of the invention will be apparent to those skilled in the art from the following disclosure and description of exemplary embodiments.

BRIEF SUMMARY

In accordance with a first aspect, food products, e.g., beverage products, comprise non-nutritive sweetener effective to perceptibly sweeten the beverage and a bitterant effective to reduce a lingering sweet aftertaste of the non-nutritive sweetener in the beverage product. The bitterant comprises gentian. In certain exemplary embodiments, the concentration of the gentian in the product is less than 50 parts per million, e.g., less than 25 ppm. The gentian and any other components included with the gentian in the bitterant may be effective to reduce the lingering sweet aftertaste of the non-nutritive sweetener by masking, modifying or other mechanism.

In accordance with another aspect, a beverage concentrate for a beverage comprises non-nutritive sweetener effective to perceptibly sweeten a full strength beverage made by diluting the concentrate with a diluent, e.g., by diluting one part beverage concentrate with five parts water, and bitterant comprising gentian and being effective to reduce a lingering sweet aftertaste of the non-nutritive sweetener in the full strength beverage. In certain exemplary embodiments, the concentration of the gentian in the beverage concentrate yields less than 50 parts per million in the full strength beverage made from the concentrate.

In accordance with another aspects disclosed here, beverages comprise non-nutritive sweetener effective to perceptibly sweeten the beverage and bitterant effective to reduce a lingering sweet aftertaste of the non-nutritive sweetener in the beverage. The bitterant comprises gentian and, in certain exemplary embodiments, the concentration of the gentian in the beverage is less than 50 parts per million.

In accordance with another aspect disclosed here, a method comprises combining a quantity of non-nutritive sweetener effective to perceptibly sweeten a beverage and with a quantity of bitterant comprising gentian, to create a mixture wherein the bitterant reduces a lingering sweet aftertaste of the non-nutritive sweetener in the beverage.

In accordance with another aspect disclosed here, a sweetener mixture comprises non-nutritive sweetener and a bitterant comprising gentian in an amount effective to reduce a lingering sweet aftertaste of the non-nutritive sweetener in the sweetener mixture. In certain exemplary embodiments the bitterant comprises gentian at a concentration less than 50 parts per million.

DETAILED DESCRIPTION OF CERTAIN EXEMPLARY EMBODIMENTS

It will be appreciated by those skilled in the art, given the benefit of the following description of certain exemplary embodiments of the beverage and other beverage products disclosed here, that at least certain embodiments of the invention have improved or alternative formulations suitable to provide desirable taste profiles, nutritional characteristics, etc. These and other aspects, features and advantages of the invention or of certain embodiments of the invention will be further understood by those skilled in the art from the following description of exemplary embodiments.

In certain exemplary and non-limiting embodiments disclosed here, a beverage product is provided, such as a beverage, beverage concentrate or the like, which is sweetened with non-nutritive sweetener effective to perceptibly sweeten the beverage and comprising at least one non-nutritive sweetener, and bitterant comprising gentian. The non-nutritive sweetener results in a lingering sweet aftertaste in the beverage, i.e., would cause such aftertaste but for the gentian bitterant or would cause more of such aftertaste but for the gentian bitterant. The bitterant comprises gentian in a concentration effective to reduce a lingering sweet aftertaste of the non-nutritive sweetener in the diet tea beverage. The bitterant may comprise other bitterant components as well, for other taste effects and/or to further reduce the lingering sweet aftertaste of the non-nutritive sweetener. In certain exemplary embodiments, the concentration of the gentian bitterant in the diet tea beverage is less than 50 parts per million.

In certain exemplary and non-limiting embodiments disclosed here, a diet tea beverage is provided. The diet tea beverage has less than about 5 calories/8 oz and comprises non-nutritive sweetener effective to perceptibly sweeten the diet tea beverage bitterant, and at least one tea flavorant selected from the group consisting of tea solids, tea extracts, tea flavors, and a mixture of any of them. The bitterant comprises gentian in a concentration effective to reduce a lingering sweet aftertaste of the non-nutritive sweetener in the diet tea beverage. The bitterant may comprise other bitterant components as well, for other taste effects and/or to further reduce the lingering sweet aftertaste of the non-nutritive sweetener. In certain exemplary embodiments, the concentration of the gentian bitterant in the diet tea beverage is less than 50 parts per million.

In certain exemplary and non-limiting embodiments disclosed here, a reduced calorie tea beverage is provided. The reduced calorie tea beverage has less than about 10 Brix and comprises non-nutritive sweetener effective to perceptibly sweeten the reduced calorie tea beverage, bitterant, at least one tea flavorant selected from the group consisting of tea solids, tea extracts, tea flavors, and mixtures of any of them, and at least one nutritive sweetener selected from the group consisting of sugar, glucose-fructose syrup made from corn (i.e. HFCS) and/or a fruit(s) (e.g. apple), and mixtures of any of them. The bitterant comprises gentian in a concentration effective to reduce a lingering sweet aftertaste of the non-nutritive sweetener in the reduced calorie tea beverage. The bitterant may comprise other bitterant components as well, for other taste effects and/or to further reduce the lingering sweet aftertaste of the non-nutritive sweetener. In certain exemplary embodiments, the concentration of the gentian bitterant in the reduced calorie tea beverage is less than 50 parts per million.

In certain exemplary and non-limiting embodiments disclosed here, a diet carbonated soda drink (hereinafter "CSD") is provided. The diet CSD has less than about 5 calories/8 oz and comprises non-nutritive sweetener effective to perceptibly sweeten the diet CSD, bitterant, and at least one flavorant. The bitterant comprises gentian in a concentration effective to reduce a lingering sweet aftertaste of the non-nutritive sweetener in the diet CSD. The bitterant may comprise other bitterant components as well, for other taste effects and/or to further reduce the lingering sweet aftertaste of the non-nutritive sweetener. In certain exemplary embodiments, the concentration of the gentian bitterant in the beverage is less than 50 parts per million.

In certain exemplary and non-limiting embodiments disclosed here, a reduced calorie carbonated soda drink is provided. The reduced calorie CSD has less than about 12 Brix and comprises non-nutritive sweetener effective to perceptibly sweeten the reduced calorie CSD, bitterant, at least one flavorant, and at least one nutritive sweetener selected from the group consisting of sugar and glucose-fructose syrup made from corn (i.e. HFCS) and/or a fruit(s) (e.g. apple), and mixtures thereof. The bitterant comprises gentian in a concentration effective to reduce a lingering sweet aftertaste of the non-nutritive sweetener in the reduced calorie carbonated soda drink. The bitterant may comprise other bitterant components as well, for other taste effects and/or to further reduce the lingering sweet aftertaste of the non-nutritive sweetener. In certain exemplary embodiments, the concentration of the gentian bitterant in the beverage is less than 50 parts per million.

In certain exemplary and non-limiting embodiments disclosed here, a near water drink is provided. The near water drink has less than about 5 calories/8 oz and comprises non-nutritive sweetener effective to perceptibly sweeten the near water drink, bitterant, and at least one flavorant. The bitterant comprises gentian in a concentration effective to reduce a lingering sweet aftertaste of the non-nutritive sweetener in the near water drink. The bitterant may comprise other bitterant components as well, for other taste effects and/or to further reduce the lingering sweet aftertaste of the non-nutritive sweetener. In certain exemplary embodiments, the concentration of the gentian bitterant in the beverage is less than 50 parts per million.

In certain exemplary and non-limiting embodiments disclosed here, a near water drink is provided, having less than about 1 Brix and comprising non-nutritive sweetener effective to perceptibly sweeten the near water drink, bitterant, at least one flavorant, and at least one nutritive sweetener selected from the group consisting of sugar, glucose-fructose syrup made from corn (i.e. HFCS) and/or a fruit(s) (e.g. apple), fructose, erythritol, D-tagatose, and mixtures thereof. The bitterant comprises gentian in a concentration effective to reduce a lingering sweet aftertaste of the non-nutritive sweetener in the diet tea beverage. The bitterant may comprise other bitterant components as well, for other taste effects and/or to further reduce the lingering sweet aftertaste of the non-nutritive sweetener. In certain exemplary embodiments, the concentration of the gentian bitterant in the beverage is less than 50 parts per million.

In certain exemplary and non-limiting embodiments disclosed here, a juice drink is provided having less than about 7 Brix and comprising from 5% to 100%, e.g., about 10% juice, non-nutritive sweetener effective to perceptibly sweeten the juice drink, bitterant, and optionally at least one nutritive sweetener selected from the group consisting of sugar, glucose-fructose syrup made from corn (i.e. HFCS) and/or a fruit(s) (e.g. apple), erythritol, D-tagatose, and a mixture of any of them. The bitterant comprises gentian in a concentration effective to reduce a lingering sweet aftertaste of the non-nutritive sweetener in the juice drink. The bitterant may comprise other bitterant components as well, for other taste effects and/or to further reduce the lingering sweet aftertaste of the non-nutritive sweetener. In certain exemplary embodiments, the concentration of the gentian bitterant in the beverage is less than 50 parts per million.

In certain exemplary and non-limiting embodiments disclosed here, a ready-to-drink coffee is provided, having less than about 8.4% solids, e.g., less than about 7.4% solids, and/or less than about 110 calories/8 oz., e.g., less than about 70 cal./8 oz. serving. The ready-to-drink coffee comprises coffee and/or coffee flavorant, non-nutritive sweetener effective to perceptibly sweeten the ready-to-drink coffee, bitterant, and optionally at least one nutritive sweetener selected from the group consisting of sugar, glucose-fructose syrup made from corn (i.e. HFCS) and/or a fruit(s) (e.g. apple), erythritol, D-tagatose, and mixtures of any of them. The bitterant comprises gentian in a concentration effective to reduce a lingering sweet aftertaste of the non-nutritive sweetener in the ready-to-drink coffee beverage. The bitterant may comprise other bitterant components as well, for other taste effects and/or to further reduce the lingering sweet aftertaste of the non-nutritive sweetener. In certain exemplary embodiments, the concentration of the gentian bitterant in the beverage is less than 50 parts per million.

In certain exemplary and non-limiting embodiments disclosed here, a sport drink is provided. The sport drink comprises non-nutritive sweetener effective to perceptibly sweeten the sport drink, bitterant, and at least one electrolyte. The bitterant comprises gentian in a concentration effective to reduce a lingering sweet aftertaste of the non-nutritive sweetener in the sport drink. The bitterant may comprise other bitterant components as well, for other taste effects and/or to further reduce the lingering sweet aftertaste of the non-nutritive sweetener. In certain exemplary embodiments, the concentration of the gentian bitterant in the beverage is less than 50 parts per million.

In certain non-limiting embodiments disclosed here, a clear beverage is provided comprising non-nutritive sweetener effective to perceptibly sweeten the beverage and bitterant. The bitterant comprises gentian in a concentration effective to reduce a lingering sweet aftertaste of the non-nutritive sweetener in the beverage. The bitterant may comprise other bitterant components as well, for other taste effects and/or to further reduce the lingering sweet aftertaste of the non-nutritive sweetener. In certain exemplary embodiments, the concentration of the gentian bitterant in the beverage is less than 50 parts per million. As used here, substantially clear means that the beverages have substantially no turbidity and substantially no color.

In certain exemplary and non-limiting embodiments disclosed here, gentian is used in an amount (i.e., at a concentration or quantity) which, in the beverage formulation in question, is non-perceptible, i.e., below its taste threshold in the formulation. In certain exemplary and non-limiting embodiments disclosed here, the bitterant, including gentian and any other bitterant components is used in an amount (i.e., at a concentration or quantity) which, in the beverage formulation in question, is non-perceptible, i.e., below its taste threshold in the formulation. That is, the gentian (and in certain embodiments the entire bitterant) is used in an amount which is less than the amount required by most consumers to detect it as an independent or distinct flavor in the beverage, i.e., there is no perceptible change of taste or flavor of the beverage other than reducing the sweet lingering aftertaste.

In certain exemplary embodiments non-nutritive sweetener(s) having lingering sweet aftertaste is used together with nutritive sweetener(s), e.g., sugar, high fructose corn syrup (HFCS) or the like, and bitterant effective in the formulation in question to reduce (i.e., partially or entirely mask or modify, or otherwise diminish or entirely eliminate) the lingering sweet aftertaste.

In certain exemplary and non-limiting embodiments disclosed here, reduced calorie beverages or corresponding concentrates are provided. In some embodiments, a reduced calorie beverage is sweetened with non-nutritive sweetener and bitterant comprising gentian in an amount sufficient to reduce the lingering sweet aftertaste of the non-nutritive sweetener in the reduced calorie beverage. The reduced calorie beverage may be sweetened entirely with one or more non-nutritive sweeteners or with a combination of nutritive and non-nutritive sweeteners.

In certain exemplary and non-limiting embodiments disclosed here, a method is provided, comprising combining a quantity of non-nutritive sweetener effective to perceptibly sweeten a beverage with a quantity of bitterant comprising gentian, to create a mixture wherein the concentration of gentian, alone or with other bitterant components, is effective to reduce the lingering sweet aftertaste of the non-nutritive sweetener in the beverage. In certain exemplary embodiments, the concentration of the gentian bitterant in the diet tea beverage is less than 50 parts per million.

In certain exemplary and non-limiting embodiments disclosed here, a method for making a beverage is provided, comprising combining a quantity of non-nutritive sweetener effective to perceptibly sweeten the beverage, with a quantity of bitterant comprising gentian. The concentration of bitterant is effective in the beverage to reduce a lingering sweet aftertaste of the non-nutritive sweetener in the beverage. In certain exemplary embodiments the bitterant comprises gentian in a concentration effective to reduce (e.g., eliminate) a lingering sweet aftertaste of the non-nutritive sweetener in the beverage. The bitterant may comprise other bitterant components as well, for other taste effects and/or to further reduce the lingering sweet aftertaste of the non-nutritive sweetener. In certain exemplary embodiments, the concentration of the gentian bitterant in the beverage is less than 50 parts per million.

In certain exemplary and non-limiting embodiments disclosed here, a method for making a beverage concentrate is provided, comprising combining (i) a quantity of non-nutritive sweetener effective to perceptibly sweeten a full strength beverage resulting from diluting the beverage concentrate with an aqueous diluent, e.g, carbonated or non-carbonated water, to make a full strength beverage, with (ii) a quantity of bitterant comprising gentian. The bitterant comprises gentian in a concentration effective to reduce a lingering sweet aftertaste of the non-nutritive sweetener in the beverage. The bitterant may comprise other bitterant components as well, for other taste effects and/or to further reduce the lingering sweet aftertaste of the non-nutritive sweetener. In certain exemplary embodiments, the concentration of the gentian bitterant in the beverage is less than 50 parts per million in the full strength beverage produced by dilution of one part beverage concentrate with five parts water.

In certain exemplary and non-limiting embodiments disclosed here, a method for making a sweetener mixture is provided, comprising combining a quantity of non-nutritive sweetener with a quantity of bitterant comprising gentian. The bitterant comprises gentian in a concentration effective to reduce a lingering sweet aftertaste of the non-nutritive sweetener in the mixture. The bitterant may comprise other bitterant components as well, for other taste effects and/or to further reduce the lingering sweet aftertaste of the non-nutritive sweetener. In certain exemplary embodiments, the concentration of the gentian is less than 50 parts per million.

A "lingering sweet aftertaste" refers to a sweet flavor caused, at least in part, by one or more non-nutritive sweeteners in the beverage that remains in the mouth of the consumer after swallowing the beverage. As used herein, a lingering sweet aftertaste extends beyond the time of perceived sweetness associated with sucrose or HFCS sweetened beverages. All artificial sweeteners and non-nutritive natural sweeteners have a time of sweetness extinction that greatly exceeds the sweetness time perceived for sucrose or HFCS.

As used here, the term "effective to perceptibly sweeten" means that the non-nutritive sweetener is used in an amount which is equal to or greater than the amount required by most consumers to detect the sweetness of the sweetener in the beverage, i.e., there is a perceptible increase of sweet taste or flavor of the beverage.

As used herein, the "bitterant" is a single gentian component or is a combination of one or gentian components, or is a combination of one or gentian components with one or more other bitterant components. A bitterant component is a formulation ingredient effective as a bitterant in the beverage or other product in question. As disclosed above, the bitterant comprises at least gentian. In certain exemplary embodiments the bitterant consists essentially of gentian. The bitterant and, if present, other bitterant components each may be a concentrate, extract or otherwise form, and may be derived from different species of plants within the same genus or from species of different genera, e.g., from one or more fruits or fruit juices, e.g., citrus fruits and citrus juices, and/or aromatic plants. In certain exemplary embodiments one or more bitterant components may be synthetic, e.g., bitterant components prepared by biosynthetic or chemical process, and/or other man-made methods. In certain exemplary embodiments of the disclosed beverages and other products, the concentration of the gentian in the finished product is less than 50 parts per million, e.g., less than about 25 parts per million. In certain exemplary embodiments of the disclosed beverages and other products, the concentration of the entire bitterant is less than 50 parts per million, e.g., less than about 25 parts per million. The word "about" is used to account for variance in measurement due to inherent errors associated with measurement techniques. The word "about", even if not explicitly used, is understood to modify all measurements disclosed, unless otherwise stated.

Unless clearly stated otherwise, reference here to non-nutritive sweetener means one or more non-nutritive sweeteners. That is, the non-nutritive sweetener may be a single non-nutritive sweetener or a combination of non-nutritive sweeteners. As used here the term "non-nutritive" means that the sweetener has no caloric content or that it has so little caloric content and such high sweetness intensity (per unit weight) that the concentration used to sweeten the beverage or other product is so low as to contribute essentially no calories (e.g., less than three or in some embodiments less than one calorie) to a single serving of the product, e.g., to an 8 oz. serving of beverage. In those embodiments employing multiple non-nutritive sweeteners, the lingering sweet aftertaste may be contributed by one or more of them. Different lingering sweet aftertastes may be contributed by different non-nutritive sweeteners or by their combination, and the bitterant may be used in accordance with this disclosure to reduce one or more of such multiple lingering sweet aftertastes. In certain exemplary embodiments the same bitterant component reduces multiple different lingering sweet aftertastes. In other embodiments, multiple bitterant components are differently efficacious in reducing lingering sweet aftertaste(s).

In certain exemplary and non-limiting embodiments, a beverage concentrate is provided, e.g., a syrup, a dry powder mix, etc. The beverage concentrate comprises bitterant and non-nutritive sweetener. The non-nutritive sweetener is at a concentration effective to perceptibly sweeten a full strength beverage made from the concentrate. The bitterant comprises gentian at a concentration effective to reduce a lingering sweet aftertaste of the non-nutritive sweetener in the full strength beverage. The bitterant may comprise other bitterant components as well, for other taste effects and/or to further reduce the lingering sweet aftertaste of the non-nutritive sweetener. In certain exemplary embodiments, the concentration of the gentian in the concentrate yields than 50 parts per million in the full strength beverage. The full strength beverage is made by diluting the concentrate with an aqueous diluent, e.g., still or carbonated water. In certain exemplary embodiments a plurality of bitterant components are utilized in the beverage concentrate, optionally originating from multiple plant species and/or synthetic sources, as discussed above. In certain embodiments, naringin and/or limonin are utilized together with gentian as the bitterant.

Unless clearly stated otherwise, reference here to gentian means one or more gentian components. That is, the gentian may be a single gentian component or a combination of gentian components. In certain exemplary embodiments, the one or more gentian components are selected from the group consisting of gentian extract, gentian salt, gentian alkaloid, gentian derivative, and a combination of any of them. In certain exemplary embodiments, the concentration of gentian in a beverage product disclosed here is less than 50 parts per million, e.g., less than 25 parts per million, e.g., between about 6.25 parts per million and about 12.5 parts per million.

Certain non-limiting embodiments disclosed here are in the form of sweetener products suitable to be added to other food products, e.g., sweetener products in a dry, liquid or other form, comprising non-nutritive sweetener and bitterant for reducing a lingering sweet aftertaste of the non-nutritive sweetener in whatever product the sweetener is used. In certain embodiments, the sweetener product is in sealed, single serving packages or multiple serving packages. Optionally, instructions are provided on or with the packaging, for combining the sweetener product with aqueous diluents or other foods, e.g., into a beverage to be sweetened.

In certain exemplary embodiments of the beverage products disclosed here, the bitterant is present in a non-perceptible amount, that is, an amount insufficient to generate an independently perceived bitter flavor. For example, no bitter taste would be perceived by the majority of consumers in a full strength beverage formulated in accordance with such exemplary embodiments. Similarly, no bitter taste would be perceived by the majority of consumers in a product to which a sweetener comprising bitterant comprising gentian was added at the recommended or intended use level. The terms "non-perceptible amount," "non-perceptible concentration," "non-perceptible level," "unrecognizable amount," "unrecognizable concentration," and "unrecognizable level" are used here and in the claims interchangeably.

Those of ordinary skill in the art will understand that, for convenience, some ingredients are described here in certain cases by reference to the original form of the ingredient in which it is added to the beverage product formulation. Such original form may differ from the form in which the ingredient is found in the finished beverage product. Thus, for example, in certain exemplary embodiments of the beverage products according to this disclosure, sucrose and liquid sucrose would typically be substantially homogenously dissolved and dispersed in the beverage. Likewise, other ingredients identified as a solid, concentrate (e.g., juice concentrate), etc. would typically be homogenously dispersed throughout the beverage or throughout the beverage concentrate, rather than remaining in their original form. Thus, reference to the form of an ingredient of a beverage product formulation should not be taken as a limitation on the form of the ingredient in the beverage product, but rather as a convenient means of describing the ingredient as an isolated component of the product formulation.

It should be understood that beverages and other beverage products in accordance with this disclosure may have any of numerous different specific formulations or constitutions. The formulation of a beverage product in accordance with this disclosure can vary depending upon such factors as the product's intended market segment, its desired nutritional characteristics, flavor profile and the like. For example, it will generally be an option to add further ingredients to the formulation of a particular beverage product. Additional (i.e., more and/or other) sweeteners, flavorings, electrolytes, vitamins, minerals, soluble fibers, fruit juices or other fruit products, tastants, masking agents and the like, flavor enhancers, and/or carbonation typically can be added to vary the taste, mouthfeel, nutritional characteristics, etc. In general, a beverage in accordance with this disclosure comprising water, sweetener, and gentian bitterant may optionally also contain acidulant, flavoring, coloring and/or carbonation, as well as other ingredients. Exemplary flavorings which may be suitable for at least certain formulations in accordance with this disclosure include cola flavoring, citrus flavoring, spice flavorings and others. Preservatives can be added if desired, depending upon the other ingredients, production technique, desired shelf life, etc. Optionally, caffeine can be added. Carbonation in the form of carbon dioxide may be added for effervescence and/or as a preservative. Additional and alternative suitable ingredients will be recognized by those skilled in the art given the benefit of this disclosure.

The beverage products disclosed here include beverages, i.e., single strength or ready-to-drink beverages, beverage concentrates and the like. Beverages include, e.g., carbonated and non-carbonated soft drinks, frozen ready-to-drink beverages, coffee beverages, tea beverages, coffee beverages, dairy beverages, powdered soft drinks as well as other solid concentrates, flavored waters, enhanced waters, near waters, fruit juice and fruit juice-flavored drinks, and sport drinks. At least certain exemplary and non-limiting embodiments of the beverage concentrates contemplated are prepared with an initial volume of water to which the additional ingredients are added. "Full strength beverage," "single strength beverage," and "ready-to-drink beverage" are used interchangeably here and refer to a beverage composition, having ingredients at concentration levels typically consumed by consumers. Full strength beverage compositions can be formed from the beverage concentrate by adding further volumes of water to the concentrate. A beverage concentrate, such as a powder or syrup, refers to a beverage product which when diluted with the appropriate amount of diluent (such as water) forms a ready-to-drink beverage. Syrup, as used herein, is generally prepared at about 5× (five fold), and more generally 3×-7× (three fold to seven fold) strength such that the syrup is diluted with 5 parts water by volume to one part syrup by volume to form a beverage. In certain exemplary embodiments the full strength beverage is prepared by combining 1 part concentrate with 5 parts water (also characterized as "1 plus 5 throw"). In certain exemplary embodiments the additional water used to form the full strength beverages is carbonated water. In certain other embodiments, a full strength beverage is directly prepared without the formation of a concentrate and subsequent dilution. Certain exemplary embodiments of the beverages disclosed here are cola-flavored carbonated beverages, characteristically containing carbonated water, sweetener, kola nut extract and/or other flavoring, caramel coloring, phosphoric acid, and optionally other ingredients.

In certain exemplary embodiments water is present at a level of from about 80% to about 99.9% by weight of a beverage in accordance with the present disclosure. In at least certain exemplary embodiments the water used in beverages and concentrates disclosed here is "treated water," which refers to water that has been treated to reduce the total dissolved solids of the water prior to optional supplementation, e.g., with calcium as disclosed in U.S. Pat. No. 7,052,725. Methods of producing treated water are known to those of ordinary skill in the art and include deionization, distillation, filtration and reverse osmosis ("r-o"), among others.

As used herein, "taste" refers to a combination of sweetness perception, temporal effects of sweetness perception, i.e., on-set and duration, off-tastes, e.g., bitterness and metallic taste, residual perception (aftertaste) and tactile perception, e.g., body and thickness. As used herein, "full-calorie" beverage formulations are those sweetened entirely with a nutritive sweetener. The term "nutritive sweetener" refers generally to sweeteners which provide significant caloric content in typical usage amounts, e.g., more than about 5 calories per 8 oz serving of beverage. As used herein, a "potent sweetener" means a sweetener which is at least twice as sweet as sucrose, that is, a sweetener which on a weight basis requires no more than half the weight of sucrose to achieve an equivalent sweetness. For example, a potent sweetener may require less than one-half the weight of sugar to achieve an equivalent sweetness in a beverage sweetened to a level of 10 degrees Brix with sugar. Potent sweeteners include both nutritive (e.g., Lo Han Guo juice concentrate) and non-nutritive sweeteners (e.g., typically, Lo Han Guo powder). In addition, non-nutritive sweeteners include both natural, non-nutritive, sweeteners (e.g., steviol glycosides, Lo Han Guo, etc.) and artificial non-nutritive sweeteners (e.g., neotame, etc.). However, for natural beverage products disclosed here, only natural, non-nutritive, sweeteners are employed. Commonly accepted potency figures for certain exemplary non-nutritive sweeteners include, for example:

| Cyclamate | 30 times as sweet as sugar |
|---|---|
| Glycyrrhizin | 30-50 times as sweet as sugar |
| Stevioside | 100-250 times as sweet as sugar |
| Mogroside V | 100-300 times as sweet as sugar |
| Rebaudioside A | 150-300 times as sweet as sugar |
| Acesulfame-K | 200 times as sweet as sugar |
| Aspartame | 200 times as sweet as sugar |
| Saccharine | 300 times as sweet as sugar |
| Neohesperidin dihydrochalcone | 300 times as sweet as sugar |
| Sucralose | 600 times as sweet as sugar |
| Alitame | 2,000 times as sweet as sugar |
| Monatin | 2,000 times as sweet as sugar |
| Neotame | 8,000 times as sweet as sugar |

As used herein, "reduced calorie beverage" means a beverage having at least a 25% reduction in calories per 8 oz serving of beverage as compared to the full calorie version employing sugar in place of the non-nutritive sweetener to achieve the same sweetness level. As used herein, a "low calorie beverage" has fewer than 40 calories/8 oz serving of beverage. As used herein, "zero-calorie" or "diet" means having less than 5 calories per serving, e.g., per 8 oz. for beverages.

Natural embodiments of the beverage products disclosed here are natural in that they do not contain anything artificial or synthetic (including any color additives regardless of source) that would not normally be expected to be in the food. As used herein, therefore, a "natural" beverage composition is defined in accordance with the following guidelines: Raw materials for a natural ingredient exists or originates in nature. Biological synthesis involving fermentation and enzymes can be employed, but synthesis with chemical reagents is not utilized. Artificial colors, preservatives, and flavors are not considered natural ingredients. Ingredients may be processed or purified through certain specified techniques including at least: physical processes, fermentation, and enzymolysis. Appropriate processes and purification techniques include at least: absorption, adsorption, agglomeration, centrifugation, chopping, cooking (baking, frying, boiling, roasting), cooling, cutting, chromatography, coating, crystallization, digestion, drying (spray, freeze drying, vacuum), evaporation, distillation, electrophoresis, emulsification, encapsulation, extraction, extrusion, filtration, fermentation, grinding, infusion, maceration, microbiological (rennet, enzymes), mixing, peeling, percolation, refrigeration/freezing, squeezing, steeping, washing, heating, mixing, ion exchange, lyophilization, osmosis, precipitation, salting out, sublimation, ultrasonic treatment, concentration, flocculation, homogenization, reconstitution, enzymolysis (using enzymes found in nature). Processing aids (currently defined as substances used as manufacturing aids to enhance the appeal or utility of a food component, including clarifying agents, catalysts, flocculants, filter aids, and crystallization inhibitors, etc., see 21 CFR §170.3(o)(24)) are considered incidental additives and may be used if removed appropriately. Natural embodiments of the beverage products disclosed here refer to products in conformance with U.S. Food and Drug Administration (FDA) standards.

As noted above, the beverages disclosed here comprise at least one non-nutritive sweetener effective to perceptibly sweeten the beverage. Sweeteners suitable for use in various embodiments of the beverages disclosed here include nutritive and non-nutritive, natural and artificial or synthetic sweeteners. In each case, the sweetener would result in lingering sweet aftertaste (or greater lingering sweet aftertaste) in the particular beverage of other food product in which it is used but for the gentian bitterant. Suitable non-nutritive sweeteners and combinations of such sweeteners are selected for the desired nutritional characteristics, taste profile for the beverage, mouthfeel and other organoleptic factors. Non-nutritive artificial sweeteners suitable for at least certain exemplary embodiments include, for example, peptide based sweeteners, e.g., aspartame, neotame, and alitame, and non-peptide based sweeteners, for example, sodium saccharin, calcium saccharin, acesulfame potassium, sodium cyclamate, calcium cyclamate, neohesperidin dihydrochalcone, and sucralose. Alitame may be less desirable for caramel-containing beverages where it has been known to form a precipitate. In certain exemplary embodiments the beverage product employs aspartame as the sweetener, either alone or with other sweeteners. In certain other exemplary embodiments the sweetener comprises aspartame and acesulfame potassium. Other non-nutritive sweeteners suitable for at least certain exemplary embodiments include, for example, sorbitol, mannitol, xylitol, glycyrrhizin, D-tagatose, erythritol, meso-erythritol, malitol, maltose, lactose, fructo-oligosaccharides, Lo Han Guo powder, mogroside V, glycyrrhizin, steviol glycosides, e.g., rebaudioside A, rebaudioside B, rebaudioside C, rebaudioside D, rebaudioside E, steviolbioside, stevioside, dulcoside A etc., *Stevia rebaudiana* extract, other dipeptides not previously mentioned, xylose, arabinose, isomalt, lactitol, maltitol, trehalose, ribose, and protein sweeteners such as monatin, thaumatin, monellin, brazzein, D-alanine, and glycine, related compounds, and mixtures of any of them. It will be within the ability of those skilled in the art, given the benefit of this disclosure, to select suitable non-nutritive sweeteners (e.g., one or a combination of non-nutritive sweeteners), either alone or together with one or more nutritive sweeteners, for a particular embodiment of the beverage products disclosed here employing a bitterant comprising a gentian to reduce lingering sweet aftertaste of the non-nutritive sweetener.

In at least certain exemplary embodiments of the beverages disclosed here, the sweetener component can include nutritive, natural crystalline, or liquid sweeteners such as sucrose, liquid sucrose, fructose, liquid fructose, glucose, liquid glucose, glucose-fructose syrup from natural sources such as apple, chicory, honey, etc., e.g., high fructose corn syrup, invert sugar, maple syrup, maple sugar, honey, brown sugar molasses, e.g., cane molasses, such as first molasses, second molasses, blackstrap molasses, and sugar beet molasses, sorghum syrup, Lo Han Guo juice concentrate and/or others. Such sweeteners are present in at least certain exemplary embodiments in an amount of from about 0.1% to about 20% by weight of the beverage, such as from about 6% to about 16% by weight, depending upon the desired level of sweetness for the beverage. To achieve desired beverage uniformity, texture and taste, in certain exemplary embodiments of the beverage products disclosed here, standardized liquid sugars as are commonly employed in the beverage industry can be used. Typically such standardized sweeteners are free of traces of nonsugar solids which could adversely affect the flavor, color or consistency of the beverage.

The sweeteners are edible consumables suitable for consumption and for use in beverages. By "edible consumables" is meant a food or beverage or an ingredient of a food or beverage for human or animal consumption. The sweetener or sweetening agent used here and in the claims can be a nutritive or non-nutritive, a natural or synthetic beverage ingredient or additive (or mixtures of them) which provides sweetness to the beverage, i.e., which is perceived as sweet by the sense of taste. The perception of flavoring agents and sweetening agents may depend to some extent on the interrelation of elements. Flavor and sweetness may also be perceived separately, i.e., flavor and sweetness perception may be both dependent upon each other and independent of each other. For example, when a large amount of a flavoring agent is used, a small amount of a sweetening agent may be readily perceptible and vice versa. Thus, the oral and olfactory interaction between a flavoring agent and a sweetening agent may involve the interrelationship of elements.

The sweetness of a sweetener used in the beverages disclosed here, as the term "sweetness" is used here and in the claims, when given a numerical value, can be determined on the basis of the sweetness of a 7% by weight aqueous solution of sucrose. This technique is well known to those skilled in the art and is seen, for example, in U.S. Pat. No. 4,902,525. As used herein, a "high potency" sweetener is one which exhibits greater sweetness than an equal amount of sucrose, and a "low potency" sweetener is one which exhibits less sweetness than an equal amount of sucrose. Sweeteners also can affect the mouth feel, i.e., the body or texture of the beverage. Too much sweetener can overpower other flavors while too little can yield in certain instances a beverage that tastes watery or flat.

Natural, non-nutritive, high potency sweeteners are suitable for use in at least certain exemplary embodiments of the beverages disclosed here. Suitable natural, non-nutritive, high potency sweeteners include, for example, Lo Han Guo powder of mogroside V content from 2 to 99%, steviol glycosides, e.g., rebaudioside A, rebaudioside B, rebaudioside C, rebaudioside D, rebaudioside E, steviolbioside, stevioside, and dulcoside A, glycyrrhizin, protein sweeteners, e.g., thaumatin, monellin, brazzein, D-alanine, monatin, or a mixture of any of them.

Non-nutritive, high potency sweeteners typically are employed at a level of milligrams per fluid ounce of beverage, according to their sweetening power, any applicable regulatory provisions of the country where the beverage is to be marketed, the desired level of sweetness of the beverage, etc. It will be within the ability of those skilled in the art, given the benefit of this disclosure, to select suitable additional or alternative sweeteners for use in various embodiments of the beverage products disclosed here.

Optionally, the sweetener component can include natural low potency sweeteners, for example, glycine, erythritol, tagatose, or a mixture of any of them. Low potency sweeteners yield low levels of sweetness when compared to high potency sweeteners, but may be desirable for certain applications in beverage products. It will be within the ability of those skilled in the art, given the benefit of this disclosure, to select suitable low potency sweeteners for use in various embodiments of the beverage products disclosed here.

As mentioned above, at least certain exemplary embodiments of the beverage products and formulations disclosed here may employ a steviol glycoside, *Stevia rebaudiana* extract or related components for sweetening. *Stevia* (e.g., *Stevia rebaudiana* Bertoni) is a sweet-tasting plant with leaves containing a complex mixture of naturally sweet diterpene glycosides. These sweeteners can be obtained, for example, by extraction or various other methods known in the art. Typically, these sweetening components are found to include, for example, stevioside, steviolbioside, the rebaudiosides (including, e.g., rebaudioside A, rebaudioside B, rebaudioside C, rebaudioside D, and rebaudioside E), and dulcoside A. In certain exemplary and non-limiting embodiments, a sweetener derived from *Stevia* is included in the beverage product in an amount between about 0.005%-1.00% by weight, e.g., between about 0.05%-1.0%, or between about 0.5%-1.0%.

The sweetener Lo Han Guo, which has various different spellings and pronunciations and is abbreviated here in some instances as LHG, can be obtained from fruit of the plant family Cucurbitaceae, tribe Jollifieae, subtribe Thladianthinae, genus *Siraitia*. LHG often is obtained from the genus/species *S. grosvenorii, S. siamensis, S. silomaradjae, S. sikkimensis, S. africana, S. borneensis,* and *S. taiwaniana*. Suitable fruit includes that of the genus/species *S. grosvenorii*, which is often called Lo Han Guo fruit. LHG contains triterpene glycosides or mogrosides, the constituents of which may be used as LHG sweeteners. Lo Han Guo is a potent sweetener which can be provided as a natural nutritive or natural, non-nutritive, sweetener. For example, Lo Han Guo juice concentrate may be a nutritive sweetener, and Lo Han Guo powder may be a non-nutritive sweetener. Lo Han Guo can be used as a juice, juice concentrate, or powder, etc. Preferably LHG juice contains at least about 0.1%, e.g., from 0.1% to about 15%, mogrosides, preferably mogroside V, mogroside IV, (11-oxo-mogroside V), siamenoside, and mixtures of any of them. LHG can be produced, for example, as discussed in U.S. Pat. No. 5,411,755, incorporated herein by reference in its entirety. Sweeteners from other fruits, vegetables or plants also may be used as natural or processed sweeteners or sweetness enhancers in at least certain exemplary embodiments of the beverages disclosed here.

Aspects of the invention relate to a beverage comprising a bitterant, e.g., one or more bitterant components in an amount (i.e., a combined amount where multiple bitterant components are employed together) sufficient to mask the lingering sweet aftertaste of non-nutritive sweetener(s) in the beverage. In certain exemplary embodiments, the bitterant comprises citrus bitterants. In certain exemplary embodiments, the bitterant comprises naringin and/or limonin to mask the lingering aftertaste. Methods for obtaining citrus bitterants are known to those skilled in the art. As illustrative examples, U.S. Pat. No. 6,544,577 and U.S. Pat. No. 6,054,168, both incorporated by reference in their entirety, disclose methods and systems for obtaining the citrus bitterants naringin and limonin from citrus fruits. According to one disclosed method of obtaining bitterants, a diafiltration step may be performed on citrus fruits or their juices. In certain embodiments disclosed in there, more than half of the total quantity of the bitterants are removed from the fruit juice.

While the level of natural bitterant(s) varies with the originating fruit, typical ranges are between about 500 ppm and about 1200 ppm of naringin are present in common grapefruit sources, and about 5 ppm to about 100 ppm of limonin are common in orange fruit sources. While the above illustrative example directly refers to oranges and grapefruit as sources of bitterants, those skilled in the art will readily appreciate in view of this disclosure, that other fruits may be utilized, including non-citrus fruits. In certain embodiments a plurality of bitterants originate from several species of fruits within the same genus. In other embodiments, the bitterants employed are from different organic genera, e.g., cocoa, tea, coffee, grains, vegetables, nuts, beer, wine, etc. In certain exemplary embodiments, the bitterant comprises one or more components obtained from aromatic plants. In certain exemplary embodiments, the bitterant comprises one or more components obtained from synthetic (e.g., biosynthetic or chemical process) methods.

In certain exemplary and non-limiting embodiments, the bitterant comprises gentian. Gentian is obtained from a variety of plants grown in many different geographic regions across the globe. Gentian was commonly used in medicines and early brewing processes. An illustrative process for extracting gentian is disclosed in U.S. Pat. No. 2,539,160, hereby incorporated by reference in its entirety. In certain exemplary and non-limiting embodiments of the beverage products disclosed here, the bitterant comprises gentian. In certain exemplary embodiments, the bitterant consists essentially of a gentian. In certain exemplary embodiments the gentian is selected from the group consisting of gentian, gentian extract, gentian salt, gentian alkaloid, gentian derivative, and a combination of any of them. In certain exemplary and non-limiting embodiments disclosed here, the gentian is effective to mask the lingering sweet aftertaste of a non-nutritive sweetener in a beverage. In certain exemplary and non-limiting embodiments disclosed here, the gentian does not perceptibly increase bitterness in the beverage. In certain exemplary and non-limiting embodiments disclosed here, the gentian reduces the lingering sweet aftertaste of a non-nutritive sweetener in the beverage. In certain exemplary and non-limiting embodiments disclosed here, the gentian does not perceptibly increase bitterness, or does not otherwise modify the taste of the beverage. In certain exemplary and non-limiting embodiments disclosed here, the gentian reduces or eliminates the lingering sweet aftertaste otherwise caused by multiple non-nutritive sweeteners in the beverage, for example, substantially eliminating the lingering sweet aftertaste in the beverage. In certain exemplary and non-limiting embodiments, the bitterant comprises the gentian with another bitterant, including, but not limited to, citrus bitterants, bitterants from other non-citrus fruits, bitterants from cocoa, tea, coffee, grains, vegetables, nuts, beer, wine, bitterants obtained from synthetic methods, or in any combination of one or more of them.

It will be readily appreciated by those skilled in the art upon reading this disclosure that the various methods and systems for obtaining the bitterants, e.g., extracting or otherwise deriving them, will vary, as will the amount and specific bitterants utilized in the bitterant, depending on any of multiple factors. Exemplary factors that may influence the methods, systems and ingredients include, but are not limited to, the desired flavor profile of the particular beverage or other product in question, the intended distribution and storage of the product, economic considerations, the concentration of the non-nutritive sweetener in the product, the selection and amount of other ingredients in the product.

The bitterant may be manufactured, distributed, and/or stored in different physical states and/or forms, including, for example, as a solid, an aqueous solution or a slurry. In certain embodiments, aqueous solutions may be introduced and/or removed to alter the state or form. Various aqueous solutions may include, for example, water, optionally carbonated water or a bitterant having a different concentration than the component. Likewise, a sweetener, such as, e.g., a single-serving portion of dry sweetener comprising bitterant and non-nutritive sweetener, may be manufactured, distributed, and/or stored in different physical states and/or forms, including, for example, as a solid, an aqueous solution or a slurry.

According to one aspect of the invention, an unrecognizable or non-perceptible amount of the gentian bitterant is used in conjunction with a non-nutritive sweetener in a beverage product, such as ready-to-drink beverages or concentrates. As used herein, the terms "a non-perceptible amount of gentian" or "the gentian does not perceptibly increase bitterness" means a quantity or concentration of gentian that reduces the lingering sweetness profile of the beverage or other food, but does not otherwise cause bitterness in the beverage. Thus, a person consuming such beverage would not discern from the gentian added to the formulation in accordance with this disclosure, a bitter taste. In contrast, however, in a comparison of a substantially duplicate formulation, one with and the other without the gentian, a typical consumer would be able to detect a reduction in the lingering sweet aftertaste of the non-nutritive sweetener, e.g., elimination of such lingering aftertaste.

Another aspect of the present disclosure relates to non-beverage products containing non-nutritive sweetener (here, again, meaning one or more non-nutritive sweeteners) and bitterant. That is, as disclosed above, another aspect of this disclosure provides sweetener products, such as consumer-useable sweetener containing non-nutritive sweetener and bitterant. The bitterant in at least certain exemplary embodiments of such consumer-useable sweetener products is present in a non-perceptible amount sufficient to reduce the lingering sweet aftertaste of the at least one non-nutritive sweetener, especially, e.g., when certain instructions are followed by the consumer in using the sweetener product.

In certain embodiments, the product is provided in the form of multiple, single-serving packages or packets in which the sweetener can be stored, distributed and used. Thus, for example, such packages hold and store dry or concentrated liquid sweetener mixture of non-nutritive sweetener(s) and one or more bitterant components for masking a lingering sweet aftertaste of the non-nutritive sweetener(s). In certain exemplary embodiments, instructions for use of the sweetener mixture are provided, e.g., for combining the mixture with a specific beverage or other food, for use as a sweetener generally, for use in an aqueous solution, etc. The instructions may be provided in any form, such as printing on the exterior of the product packaging, for example, on the exterior of a cardboard box containing the sweetener mixture and/or on the exterior of packet holding a single-serving of the sweetener mixture. In other embodiments, instructions may be provided on a separate insert contained within the product, such as, e.g., as printing on one or more readable surfaces.

In certain exemplary embodiments, instructions are not necessary and are not provided, because the consumer is aware of the amount of sweetener mixture to be used, or the amount to be used is readily estimated. As an example, consumers who use packets of sweetener in coffee or other beverages generally apply a consistent number of sweetener packets per unit volume of beverage. For example, a consumer may routinely place 2 one-ounce packets of sweetener in their coffee regardless of whether the sweetener is sugar, aspartame, sucralose, etc. Thus, certain embodiments of the product may not include instructions for adding the sweetener mixture to coffee or other aqueous beverage solution. The one or more bitterant components of the bitterant of the sweetener mask the lingering sweet aftertaste of the non-nutritive sweetener(s). As disclosed above, in at least certain exemplary and non-limiting embodiments the bitterant is present in the sweetener mixture in a non-perceptible amount.

Acid used in beverages disclosed here can serve any one or more of several functions, including, for example, lending tartness to the taste of the beverage, enhancing palatability, increasing thirst quenching effect, modifying sweetness, and acting as a mild preservative. Suitable acids are known and will be apparent to those skilled in the art given the benefit of this disclosure. Exemplary acids suitable for use in some or all embodiments of the beverage products disclosed here include phosphoric acid, citric, malic, tartaric, lactic, formic, ascorbic, hydrochloric, sulfuric, fumaric, gluconic, succinic, maleic, adipic, and combinations of any of them. The acid can be used in solution form, for example, and in an amount sufficient to provide the desired pH of the beverage. Typically, for example, the one or more acids of the acidulant are used in an amount, collectively, of from about 0.01% to about 1.0% by weight of the beverage, e.g., from about 0.1% to about 0.25% by weight of the beverage, depending upon the acidulant used, desired pH, other ingredients used, etc. The pH of at least certain exemplary embodiments of the beverages disclosed here can be a value within the range of from about 2.0 to about 5.0. The acid in certain exemplary embodiments enhances beverage flavor. Too much acid can impair the beverage flavor and result in sourness or other off-taste, while too little acid can make the beverage taste flat.

The particular acid or acids chosen and the amount used will depend, in part, on the other ingredients, the desired shelf life of the beverage product, as well as effects on the beverage pH, titratable acidity, and taste. Those skilled in the art, given the benefit of this disclosure, will recognize that when preparing beverage products containing peptide-based artificial sweeteners such as aspartame, the resulting beverage composition is best maintained below a certain pH to retain the sweetening effect of the artificial sweetener. In the formation of calcium-supplemented beverages, the presence of calcium salts increases the pH which requires additional acids to both assist the dissolution of the salt and maintain a desirable pH for stability of the artificial sweetener. The presence of the additional acid in the beverage composition, which increases the titratable acidity of the composition, will result in a more tart or sour taste to the resulting beverage. It will be within the ability of those skilled in the art, given the benefit of this disclosure, to select a suitable acid or combination of acids and the amounts of such acids for the acidulant component of any particular embodiment of the beverage products disclosed here.

Certain exemplary embodiments of the beverage products disclosed here may include at least one or more soluble fiber. Exemplary soluble fibers suitable for use in some or all embodiments of the beverage products disclosed here include guar gum, gum Arabic, acacia gum, pectin, inulin, carrageenan, xanthan, polydextrose, fructans, beta-glucan, and combinations of any of them.

Certain exemplary embodiments of the beverage products disclosed here also may contain small amounts of alkaline agents to adjust pH. Such agents include, e.g., potassium hydroxide, sodium hydroxide and potassium carbonate. For example, the alkaline agent potassium hydroxide may be used in an amount of from about 0.02 to about 0.04% by weight, with an amount of about 0.03% being typical for certain beverages. The amount will depend, of course, on the type of alkaline agents and on the degree to which the pH is to be adjusted.

The beverage products disclosed here optionally contain a flavor composition, i.e., one or more flavor components, for example, natural or synthetic fruit flavors, botanical flavors, other flavors, and mixtures of any of them. As used here, the term "fruit flavor" refers generally to those flavors derived from the edible reproductive part of a seed plant. Included are both those wherein a sweet pulp is associated with the seed, e.g., banana, tomato, cranberry and the like, and those having a small, fleshy berry. The term berry also is used here to include aggregate fruits, i.e., not "true" berries, but that are commonly accepted as a berry. Also included within the term "fruit flavor" are synthetically prepared flavors made to simulate fruit flavors derived from natural sources. Examples of suitable fruit or berry sources include whole berries or portions thereof, berry juice, berry juice concentrates, berry purees and blends thereof, dried berry powders, dried berry juice powders, and the like.

Exemplary fruit flavors include the citrus flavors, e.g., orange, lemon, lime and grapefruit, flavors such as apple, grape, cherry, and pineapple flavors and the like, and mixtures of any of them. In certain exemplary embodiments the beverage products comprise a fruit flavor component, e.g., a juice concentrate or juice. As used here, the term "botanical flavor" refers to flavors derived from parts of a plant other than the fruit. As such, botanical flavors can include those flavors derived from essential oils and extracts of nuts, bark, roots and leaves. Also included within the term "botanical flavor" are synthetically prepared flavors made to simulate botanical flavors derived from natural sources. Examples of such flavors include cola flavors, tea flavors, and the like, and mixtures of any of them. The flavor component can further comprise a blend of the various above-mentioned flavors. In certain exemplary embodiments of the beverage products disclosed here, a cola flavor component or a tea flavor component is used. The particular amount of the flavor component useful for imparting flavor characteristics to the beverages of the present invention will depend upon the flavor(s) selected, the flavor impression desired, and the form of the flavor component. Those skilled in the art, given the benefit of this disclosure, will be readily able to determine the amount of any particular flavor component(s) used to achieve the desired flavor impression.

Juices suitable for use in at least certain exemplary embodiments of the beverage products disclosed here include, e.g., fruit, vegetable, and berry juices. Juices can be employed in the present invention in the form of a concentrate, puree, single-strength juice, or other suitable forms. The term "juice" as used here includes single-strength fruit, berry, or vegetable juice, as well as concentrates, purees, milks, and other forms. Multiple different fruit, vegetable and/or berry juices can be combined, optionally, along with other flavorings, to generate a beverage having a desired flavor. Examples of suitable juice sources include plum, prune, date, currant, fig, grape, raisin, cranberry, pineapple, peach, banana, apple, pear, guava, apricot, Saskatoon berry, blueberry, plains berry, prairie berry, mulberry, elderberry, Barbados cherry (acerola cherry), choke cherry, date, coconut, olive, raspberry, strawberry, huckleberry, loganberry, currant, dewberry, boysenberry, kiwi, cherry, blackberry, quince, buckthorn, passion fruit, sloe, rowan, gooseberry, pomegranate, persimmon, mango, rhubarb, papaya, litchi, lemon, orange, lime, tangerine, tangerine, mandarin orange, tangelo, pomelo, grapefruit, yumberry, etc. Numerous additional and alternative juices suitable for use in at least certain exemplary embodiments will be apparent to those skilled in the art given the benefit of this disclosure. In the beverages of the present invention employing juice, juice may be used, for example, at a level of at least about 0.2% by weight of the beverage. In certain exemplary embodiments juice is employed at a level of from about 0.2% to about 40% by weight of the beverage. Typically, juice can be used, if at all, in an amount of from about 1% to about 20% by weight.

Certain such juices which are lighter in color can be included in the formulation of certain exemplary embodiments to adjust the flavor and/or increase the juice content of the beverage without darkening the beverage color. Examples of such juices include apple, pear, pineapple, peach, lemon, lime, orange, apricot, grapefruit, tangerine, rhubarb, cassis, quince, passion fruit, papaya, mango, guava, litchi, kiwi, mandarin, coconut, and banana. Deflavored and decolored juices can be employed if desired.

Other flavorings suitable for use in at least certain exemplary embodiments of the beverage products disclosed here include, e.g., spice flavorings, such as cassia, clove, cinnamon, pepper, ginger, vanilla spice flavorings, cardamom, coriander, root beer, sassafras, ginseng, and others. Numerous additional and alternative flavorings suitable for use in at least certain exemplary embodiments will be apparent to those skilled in the art given the benefit of this disclosure. Flavorings can be in the form of an extract, oleoresin, juice concentrate, bottler's base, or other forms known in the art. In at least certain exemplary embodiments, such spice or other flavors complement that of a juice or juice combination.

The one or more flavorings can be used in the form of an emulsion. A flavoring emulsion can be prepared by mixing some or all of the flavorings together, optionally together with other ingredients of the beverage, and an emulsifying agent. The emulsifying agent may be added with or after the flavorings mixed together. In certain exemplary embodiments the emulsifying agent is water-soluble. Exemplary suitable emulsifying agents include gum acacia, modified starch, carboxymethylcellulose, gum tragacanth, gum ghatti and other suitable gums. Additional suitable emulsifying agents will be apparent to those skilled in the art of beverage formulations, given the benefit of this disclosure. The emulsifier in exemplary embodiments comprises greater than about 3% of the mixture of flavorings and emulsifier. In certain exemplary embodiments the emulsifier is from about 5% to about 30% of the mixture.

Carbon dioxide is used to provide effervescence to certain exemplary embodiments of the beverages disclosed here. Any of the techniques and carbonating equipment known in the art for carbonating beverages can be employed. Carbon dioxide can enhance the beverage taste and appearance and can aid in safeguarding the beverage purity by inhibiting and destroying objectionable bacteria. In certain embodiments, for example, the beverage has a $CO_2$ level up to about 7.0 volumes carbon dioxide. Typical embodiments may have, for example, from about 0.5 to 5.0 volumes of carbon dioxide. As used here, one volume of carbon dioxide is defined as the amount of carbon dioxide absorbed by any given quantity of water at 60° F. (16° C.) temperature and atmospheric pressure. A volume of gas occupies the same space as does the water by which it is absorbed. The carbon dioxide content can be selected by those skilled in the art based on the desired level of effervescence and the impact of the carbon dioxide on the taste or mouthfeel of the beverage. The carbonation can be natural or synthetic.

Optionally, caffeine can be added to various embodiments of the beverage products disclosed here. The amount of caffeine added is determined by the desired beverage properties, any applicable regulatory provisions of the country where the beverage is to be marketed, etc. In certain exemplary embodiments caffeine is included at a level of 0.02 percent or less by weight of the beverage. The caffeine must be of a purity acceptable for use in foods and beverages. The caffeine can be natural or synthetic in origin.

The beverage products disclosed here may contain additional ingredients, including, generally, any of those typically found in beverage formulations. These additional ingredients, for example, can typically be added to a stabilized beverage concentrate. Examples of such additional ingredients include, but are not limited to, caffeine, caramel and other coloring agents or dyes, antifoaming agents, gums, emulsifiers, tea solids, cloud components, and mineral and non-mineral nutritional supplements. Examples of non-mineral nutritional supplement ingredients are known to those of ordinary skill in the art and include, for example, antioxidants and vitamins, including Vitamins A, D, E (tocopherol), C (ascorbic acid), B (thiamine), $B_2$ (riboflavin), $B_6$, $B_{12}$, K, niacin, folic acid, biotin, and combinations of any of them. The optional non-mineral nutritional supplements are typically present in amounts generally accepted under good manufacturing practices. Exemplary amounts are between about 1% and about 100% RDV, where such RDVs are established. In certain exemplary embodiments the non-mineral nutritional supplement ingredient(s) are present in an amount of from about 5% to about 20% RDV, where established.

Preservatives may be used in at least certain embodiments of the beverage products disclosed here. That is, at least certain exemplary embodiments contain an optional dissolved preservative system. Solutions with a pH below 4, and especially those below 3, typically are "microstable," i.e., they resist growth of microorganisms, and so are suitable for longer term storage prior to consumption without the need for further preservatives. However, an additional preservative system can be used if desired. If a preservative system is used, it can be added to the beverage product at any suitable time during production, e.g., in some cases prior to the addition of the sweetener. As used here, the terms "preservation system" or "preservatives" include all suitable preservatives approved for use in food and beverage compositions, including, without limitation, such known chemical preservatives as benzoates, e.g., sodium, calcium, and potassium benzoate, sorbates, e.g., sodium, calcium, and potassium sorbate, citrates, e.g., sodium citrate and potassium citrate, polyphosphates, e.g., sodium hexametaphosphate (SHMP), and mixtures of any of them, and antioxidants such as ascorbic acid, EDTA, BHA, BHT, TBHQ, dehydroacetic acid, dimethyldicarbonate, ethoxyquin, heptylparaben, and combinations of any of them. Preservatives can be used in amounts not exceeding mandated maximum levels under applicable laws and regulations. The level of preservative used typically is adjusted according to the planned final product pH, as well as an evaluation of the microbiological spoilage potential of the particular beverage formulation. The maximum level employed typically is about 0.05% by weight of the beverage. It will be within the ability of those skilled in the art, given the benefit of this disclosure, to select a suitable preservative or combination of preservatives for beverages according to this disclosure.

Other methods of beverage preservation suitable for at least certain exemplary embodiments of the beverage products disclosed here include, e.g., aseptic packaging and/or heat treatment or thermal processing steps, such as hot filling and tunnel pasteurization. Such steps can be used to reduce yeast, mold and microbial growth in the beverage products. For example, U.S. Pat. No. 4,830,862 to Braun et al. discloses the use of pasteurization in the production of fruit juice beverages as well as the use of suitable preservatives in carbonated beverages. U.S. Pat. No. 4,925,686 to Kastin discloses a heat-pasteurized freezable fruit juice composition which contains sodium benzoate and potassium sorbate.

Degrees Brix (symbol $°Bx$) is a measurement of the mass ratio of dissolved sucrose to water in a liquid. It is measured with a saccharimeter that measures specific gravity of a liquid or more easily with a refractometer. A 25° Bx solution has 25 grams of sucrose sugar per 100 grams of liquid. Or, to put it another way, there are 25 grams of sucrose sugar and 75 grams of water in the 100 grams of solution.

Those of ordinary skill in the art will understand that, for convenience, some ingredients are described here in certain cases by reference to the original form of the ingredient in which it is used in formulating or producing the beverage product. Such original form of the ingredient may differ from the form in which the ingredient is found in the finished beverage product. Thus, for example, in certain exemplary embodiments of the beverage products disclosed here, sucrose and liquid sucrose would typically be homogenously dissolved and dispersed in the beverage. Likewise, other ingredients identified as a solid, concentrate (e.g., juice concentrate), etc. would typically be homogenously dispersed throughout the beverage or throughout the beverage concentrate, rather than remaining in their original form. Thus, reference to the form of an ingredient in a beverage product formulation should not be taken as a limitation on the form of the ingredient in the beverage product, but rather as a convenient means of describing the ingredient as an isolated component of the product formulation.

EXAMPLES

The following examples are specific embodiments of the present invention, but are not intended to limit it.

Example 1

A 10% stock solution of gentian solid extract (91.26% solids, a product of NATUREX Inc.) was dissolved in propylene glycol. A 5-liter syrup for use in making a finished beverage was also prepared. Exemplary beverage formulations and their respective ingredients for making a syrup are listed below.

Exemplary Lemon-Lime Soda Beverage Formulation:

| Ingredient | Amount (g) |
| --- | --- |
| Preservative #1 | 7.98 |
| Preservative #2 | 0.89 |
| Buffer | 18.01 |
| Acidulant | 53.52 |
| Rebaudioside A | 10.49 |
| Flavor #1 | 44.62 |
| Flavor #2 | 7.44 |
| Treated Water | Quantity sufficient for 5 liters total volume |

Exemplary Cola Soda Beverage Formulation:

| Ingredient | Amount (g) |
|---|---|
| Caffeine | 3.00 |
| Rebaudioside A | 10.50 |
| Flavor #1 | 2.94 |
| Flavor, Preservatives and Acidulant | 79.91 |
| Treated Water | Quantity sufficient for 5 liters total volume |

Each of the above formulations was prepared by dissolving the listed ingredients with vigorous stirring in sufficient water to obtain 5.0 liters of syrup. Then, 50 mL portions of the syrup were added respectively to 250 mL portions of carbonated water (4.7 volumes $CO_2$), i.e., a 1 plus 5 "throw", yielding beverages with a concentration of rebaudioside A at 350 ppm.

To form a finished beverage, the aforementioned beverages were spiked with gentian stock solution at concentrations greater than zero and less than 100 ppm (e.g., 1 ppm to 50 ppm, 10 ppm to 50 ppm, 6.25 ppm to 12.5 ppm). For example, 6.25 μL of stock solution per 100 g of beverage yields a concentration of 6.25 ppm in the finished beverage and 12.5 μL of stock solution per 100 g of beverage yields a concentration of 12.5 ppm in the finished beverage. The finished beverages were sealed, shaken several times and aged for three days in a temperature-controlled (90° F.) room.

A taste panel consisting of five tasters evaluated the finished beverages. Results indicated that when the concentration of gentian extract in the finished beverage was increased, the sweet lingering aftertaste was reduced. In finished beverages where the gentian extract concentration was from 6.25 ppm to 12.5 ppm, the sweet lingering aftertaste of rebaudioside A was almost entirely eliminated. As the concentration of gentian extract was increased from 25 ppm to 50 ppm, the beverages yielded a corresponding increase in bitter taste (i.e., gentian flavor was perceived).

Given the benefit of the above disclosure and the description of certain exemplary embodiments, it will be apparent to those skilled in the art that numerous alternative and different embodiments are possible in keeping with the general principles of the invention disclosed here. Those skilled in this art will recognize that all such various modifications and alternative embodiments are within the true scope and spirit of the invention. The appended claims are intended to cover all such modifications and alternative embodiments. It should be understood that the use of a singular indefinite or definite article (e.g., "a," "an," "the," etc.) in this disclosure and in the following claims follows the traditional approach in patents of meaning "at least one" unless in a particular instance it is clear from context that the term is intended in that particular instance to mean specifically one and only one. Likewise, the term "comprising" is open ended, not excluding additional items, features, components, etc.

What is claimed is:

1. A beverage concentrate for a beverage, comprising:
   a non-nutritive sweetener component comprising rebaudioside A, wherein the rebaudioside A is effective to perceptibly sweeten a full strength beverage when the beverage concentrate is mixed with a diluent to make a full strength beverage; and
   a bitterant component;
   wherein the bitterant component comprises a gentian component; and
   wherein the concentration of the gentian component is less than 50 parts per million and effective to reduce a lingering sweet aftertaste of the non-nutritive sweetener in a full strength beverage produced by dilution of one part beverage concentrate with five parts water.

2. The beverage concentrate of claim 1, wherein the beverage concentrate is a syrup.

3. The beverage concentrate of claim 1, wherein the gentian component does not perceptibly increase bitterness in the full strength beverage.

4. The beverage concentrate of claim 1, wherein the non-nutritive sweetener further comprises a natural, non-nutritive, high potency sweetener selected from the group consisting of steviol glycosides, *Stevia rebaudiana* extract, Lo Han Guo powder, glycyrrhizin, thaumatin, monellin, brazzein, D-alanine, monatin, and a mixture of any of them.

5. The beverage concentrate of claim 1, wherein the bitterant component consists essentially of gentian component.

6. The beverage concentrate of claim 1, wherein the gentian component is selected from the group consisting of gentian, gentian extract, gentian salt, gentian alkaloid, gentian derivative, and a combination of any of them.

7. The beverage concentrate of claim 1, wherein the concentration of the gentian component is less than 25 parts per million.

8. The beverage concentrate of claim 7, wherein the concentration of the gentian component is between 6.25 parts per million and 12.25 parts per million.

9. The beverage concentrate of claim 1, further comprising at least one nutritive sweetener.

10. A beverage comprising:
    a non-nutritive sweetener component comprising rebaudioside A, wherein the rebaudioside A is effective to perceptibly sweeten the beverage; and
    a bitterant component reducing a lingering sweet aftertaste of the non-nutritive sweetener in the beverage;
    wherein the bitterant component comprises a gentian component; and
    wherein the concentration of the gentian component in the beverage is less than 50 parts per million.

11. The beverage of claim 10, wherein the rebaudioside A is effective to perceptibly sweeten the beverage.

12. The beverage of claim 10, wherein the gentian component does not perceptibly increase bitterness in the beverage.

13. The beverage of claim 10, further comprising a nutritive sweetener, an artificial non-nutritive sweetener, a natural, non-nutritive, low potency sweetener, an additional natural, non-nutritive, high potency sweetener, or a mixture of any of them.

14. The beverage of claim 10, wherein the bitterant consists essentially of gentian component.

15. The beverage of claim 10, wherein the gentian component is selected from the group consisting of gentian, gentian extract, gentian salt, gentian alkaloid, gentian derivative, and a combination of any of them.

16. The beverage of claim 10, wherein the concentration of the gentian component is less than 25 parts per million.

17. The beverage of claim 16, wherein the concentration of the gentian component is between 6.25 parts per million and 12.25 parts per million.

18. The beverage of claim 10, wherein the beverage is a diet tea beverage, a reduced calorie tea beverage, a diet carbonated soda drink, a reduced calorie carbonated soda drink, a near water drink, a juice drink, a ready-to-drink coffee drink, or a sport drink.

19. The beverage of claim 10, further comprising at least one nutritive sweetener.

* * * * *